(12) United States Patent
Thapliya

(10) Patent No.: US 9,705,901 B2
(45) Date of Patent: Jul. 11, 2017

(54) UNAUTHORIZED-COMMUNICATION DETECTING APPARATUS, UNAUTHORIZED-COMMUNICATION DETECTING METHOD AND NON-TRANSITORY COMPUTER READABLE MEDIUM

(71) Applicant: FUJI XEROX CO., LTD., Tokyo (JP)

(72) Inventor: Roshan Thapliya, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/643,494

(22) Filed: Mar. 10, 2015

(65) Prior Publication Data

US 2015/0294111 A1    Oct. 15, 2015

(30) Foreign Application Priority Data

Apr. 11, 2014  (JP) ................................. 2014-081694

(51) Int. Cl.
*H04L 29/06* (2006.01)
*G06F 21/55* (2013.01)
*G06F 21/56* (2013.01)

(52) U.S. Cl.
CPC ........ *H04L 63/1416* (2013.01); *G06F 21/554* (2013.01); *G06F 21/566* (2013.01)

(58) Field of Classification Search
CPC ... H04L 63/1416; G06F 21/566; G06F 21/554
USPC ....... 713/162, 150; 726/22, 23, 26, 6, 34, 35
See application file for complete search history.

(56) References Cited

U.S. PATENT DOCUMENTS

| | | | | |
|---|---|---|---|---|
| 6,032,037 A * | 2/2000 | Jeffers | .................... | G08B 29/16 455/404.1 |
| 6,035,191 A * | 3/2000 | Moore | .................... | H04M 3/38 455/418 |
| 6,956,840 B1 * | 10/2005 | Proctor, Jr. | .......... | H04B 7/2628 370/342 |
| 7,136,412 B1 * | 11/2006 | Gavish | ................ | H04L 12/5695 375/222 |
| 7,296,288 B1 * | 11/2007 | Hill | ..................... | H04L 41/0896 713/194 |
| 7,716,740 B2 * | 5/2010 | Robert | ................ | H04L 63/1408 455/410 |
| 8,555,388 B1 * | 10/2013 | Wang | .................. | H04L 63/1416 709/245 |
| 8,773,990 B1 * | 7/2014 | Rasool | .................. | H04W 12/12 370/230 |

(Continued)

OTHER PUBLICATIONS

Sep. 21, 2015 Office Action issued in Australian Patent Application No. 2015201726.

(Continued)

*Primary Examiner* — David García Cervetti
(74) *Attorney, Agent, or Firm* — Oliff PLC

(57) ABSTRACT

There is provided an unauthorized-communication detecting apparatus. A measuring unit measures a transition of a communication state value between the unauthorized-communication detecting apparatus and a client apparatus. A transition pattern storage unit stores a transition pattern of the communication state value. An unauthorized-communication detecting unit detects unauthorized communication of the client apparatus on the basis of the transition pattern and a transition of the measured communication state value.

7 Claims, 7 Drawing Sheets

(56) References Cited

U.S. PATENT DOCUMENTS

| | | | |
|---|---|---|---|
| 8,918,843 B1* | 12/2014 | Vivanco | H04W 12/12 709/229 |
| 2003/0104821 A1* | 6/2003 | Gerner | B60R 25/102 455/456.1 |
| 2004/0107219 A1* | 6/2004 | Rosenberger | H04L 12/2602 |
| 2004/0114519 A1* | 6/2004 | MacIsaac | H04L 12/2602 370/232 |
| 2005/0262563 A1* | 11/2005 | Mahone | G06F 21/55 726/22 |
| 2005/0288065 A1* | 12/2005 | Schmerts | H04B 17/382 455/566 |
| 2007/0100994 A1* | 5/2007 | Armstrong | G06F 11/28 709/224 |
| 2007/0143552 A1* | 6/2007 | Rastogi | H04L 63/1458 711/154 |
| 2008/0004107 A1* | 1/2008 | Nguyen | G06Q 10/10 463/29 |
| 2008/0016001 A1* | 1/2008 | Nakano | G06F 21/10 705/58 |
| 2009/0044005 A1* | 2/2009 | Komura | H04L 9/3271 713/150 |
| 2009/0049494 A1* | 2/2009 | Freundlich | H04N 21/4122 725/110 |
| 2009/0055919 A1* | 2/2009 | Komura | H04L 63/1408 726/11 |
| 2010/0005499 A1* | 1/2010 | Covey | H04L 12/1827 725/109 |
| 2010/0169475 A1* | 7/2010 | Woundy | H04L 41/0896 709/224 |
| 2010/0241974 A1* | 9/2010 | Rubin | G06F 21/554 715/764 |
| 2010/0281539 A1* | 11/2010 | Burns | H04L 63/1441 726/23 |
| 2011/0003581 A1* | 1/2011 | Lee | H04W 12/12 455/410 |
| 2011/0021234 A1* | 1/2011 | Tibbitts | H04W 48/04 455/517 |
| 2011/0059688 A1* | 3/2011 | Noonan | H04W 8/005 455/1 |
| 2011/0064417 A1* | 3/2011 | Sato | H04B 10/40 398/135 |
| 2012/0137367 A1* | 5/2012 | Dupont | G06F 21/00 726/25 |
| 2012/0151033 A1* | 6/2012 | Baliga | H04L 63/1425 709/224 |
| 2012/0167210 A1* | 6/2012 | Oro Garcia | H04L 63/1425 726/22 |
| 2012/0189410 A1* | 7/2012 | Toebes | B65G 1/0492 414/273 |
| 2012/0197431 A1* | 8/2012 | Toebes | B65G 1/0492 700/217 |
| 2012/0233694 A1* | 9/2012 | Baliga | G06F 21/568 726/23 |
| 2012/0239557 A1* | 9/2012 | Weinflash | G06Q 40/02 705/39 |
| 2012/0304007 A1* | 11/2012 | Hanks | H04L 67/12 714/26 |
| 2013/0065510 A1* | 3/2013 | Laporte | H04L 12/5692 455/7 |
| 2013/0097699 A1* | 4/2013 | Balupari | G06F 21/552 726/22 |
| 2013/0174256 A1* | 7/2013 | Powers | H04L 63/1416 726/23 |
| 2013/0198203 A1* | 8/2013 | Bates | G06F 17/30861 707/748 |
| 2013/0227642 A1* | 8/2013 | Chang | G06F 21/316 726/2 |
| 2013/0318607 A1* | 11/2013 | Reed | G06F 11/3062 726/23 |
| 2014/0018059 A1* | 1/2014 | Noonan | H04W 48/04 455/419 |
| 2014/0047543 A1* | 2/2014 | Kim | H04L 63/1441 726/23 |
| 2014/0113619 A1* | 4/2014 | Tibbitts | G07C 5/008 455/419 |
| 2014/0157405 A1* | 6/2014 | Joll | H04L 63/1425 726/22 |
| 2014/0162681 A1* | 6/2014 | Noonan | H04W 4/021 455/456.1 |
| 2014/0189798 A1* | 7/2014 | Grimaud | G06F 21/36 726/4 |
| 2014/0194084 A1* | 7/2014 | Noonan | H04W 8/005 455/404.1 |
| 2014/0245374 A1* | 8/2014 | Deerman | H04L 63/20 726/1 |
| 2014/0325682 A1* | 10/2014 | Turgeman | H04L 63/126 726/29 |
| 2014/0344912 A1* | 11/2014 | Chapman, II | H04L 63/1441 726/11 |
| 2014/0344927 A1* | 11/2014 | Turgeman | H04W 12/06 726/22 |
| 2015/0200956 A1* | 7/2015 | Koide | H04L 43/04 726/22 |
| 2015/0262009 A1* | 9/2015 | Szabo | G06F 17/30985 709/224 |
| 2015/0264061 A1* | 9/2015 | Ibatullin | H04L 63/145 726/23 |
| 2015/0264068 A1* | 9/2015 | Beauchesne | H04L 63/1416 726/23 |
| 2015/0264069 A1* | 9/2015 | Beauchesne | H04L 63/1416 726/23 |
| 2015/0264073 A1* | 9/2015 | Tavakoli | H04L 63/1425 726/23 |
| 2015/0264078 A1* | 9/2015 | Beauchesne | H04L 63/1441 726/23 |
| 2015/0264083 A1* | 9/2015 | Prenger | H04L 63/1475 726/23 |
| 2015/0286273 A1* | 10/2015 | Tazebay | G06F 1/3209 713/323 |
| 2015/0295926 A1* | 10/2015 | Husain | H04L 63/145 726/6 |
| 2015/0317475 A1* | 11/2015 | Aguayo Gonzalez | G06F 21/55 726/23 |
| 2015/0332045 A1* | 11/2015 | Akiyama | G06F 21/54 726/23 |

OTHER PUBLICATIONS

Rajab et al., "A Multifaceted Approach to Understanding the Botnet Phenomenon," IMC, Oct. 25-27, 2006, Rio de Janeiro, Brazil.

* cited by examiner

FIG. 3A
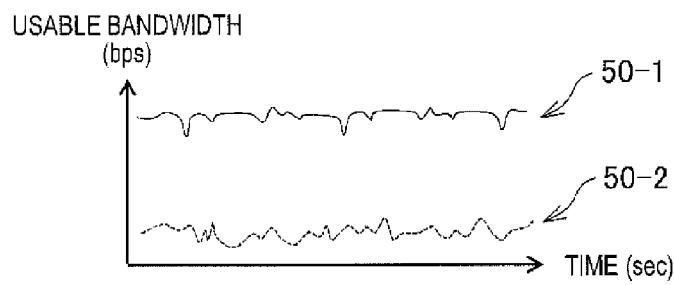
FIG. 3B
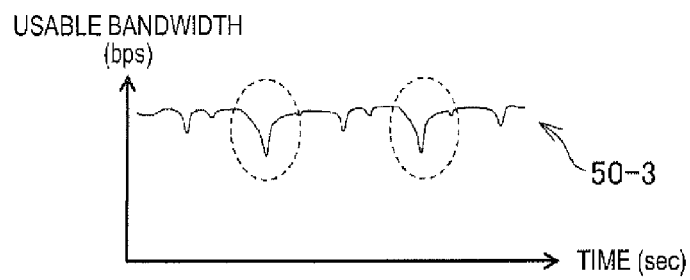
FIG. 4
| APPARATUS ID | POSITION INFORMATION | COMMUNICATION STANDARD | TRANSITION PATTERN |
|---|---|---|---|
| D0001 | POSITION a | 3.9G | BWa(T(0)), BWa(T(1)), ···BWa(T(n)) |
| | POSITION b | 3G | BWb(T(0)), BWb(T(1)), ···BWb(T(n)) |
| | ... | ... | ... |
| D0002 | | | |
| ... | | | |
| | | | |

| MEASUREMENT TIME | T(0) | T(1) | ... | T(n) |
|---|---|---|---|---|
| MEASURED USABLE BANDWIDTH | BW(t(x)) | BW(t(x+1)) | ... | BW(t(x+n)) |
| TRANSITION PATTERN | BWp(T(0)) | BWp(T(1)) | ... | BWp(T(n)) |
| BW(t) − BWp(T) | $\alpha 1$ | $\alpha 2$ | ... | $\alpha n$ |
| SUM | $\alpha 1$ | $\alpha 1 + \alpha 2$ | ... | $\Sigma \alpha$ |

UNAUTHORIZED-COMMUNICATION DETECTING APPARATUS, UNAUTHORIZED-COMMUNICATION DETECTING METHOD AND NON-TRANSITORY COMPUTER READABLE MEDIUM

CROSS-REFERENCE TO RELATED APPLICATIONS

This application is based on and claims priority under 35 U.S.C. §119 from Japanese Patent Application No. 2014-081694 filed on Apr. 11, 2014.

TECHNICAL FIELD

The present invention relates to an unauthorized-communication detecting apparatus, an unauthorized-communication detecting method and non-transitory computer readable medium, and more specifically, to a technology for detecting unauthorized communication of a client apparatus.

SUMMARY

According to an aspect of the exemplary embodiments of the present invention, there is provided an unauthorized-communication detecting apparatus comprising: a measuring unit that measures a transition of a communication state value between the unauthorized-communication detecting apparatus and a client apparatus; a transition pattern storage unit that stores a transition pattern of the communication state value; and an unauthorized-communication detecting unit that detects unauthorized communication of the client apparatus on the basis of the transition pattern and a transition of the measured communication state value.

BRIEF DESCRIPTION OF THE DRAWINGS

Exemplary embodiments of the present invention will be described in detailed based on the following figures, wherein:

FIG. 3A is a view illustrating the kinds of communication states;

FIG. 3B is a view illustrating the kind of a communication state;

FIG. 4 is a view illustrating a data storage example of a transition pattern information storage unit;

DETAILED DESCRIPTION

Figure 1:
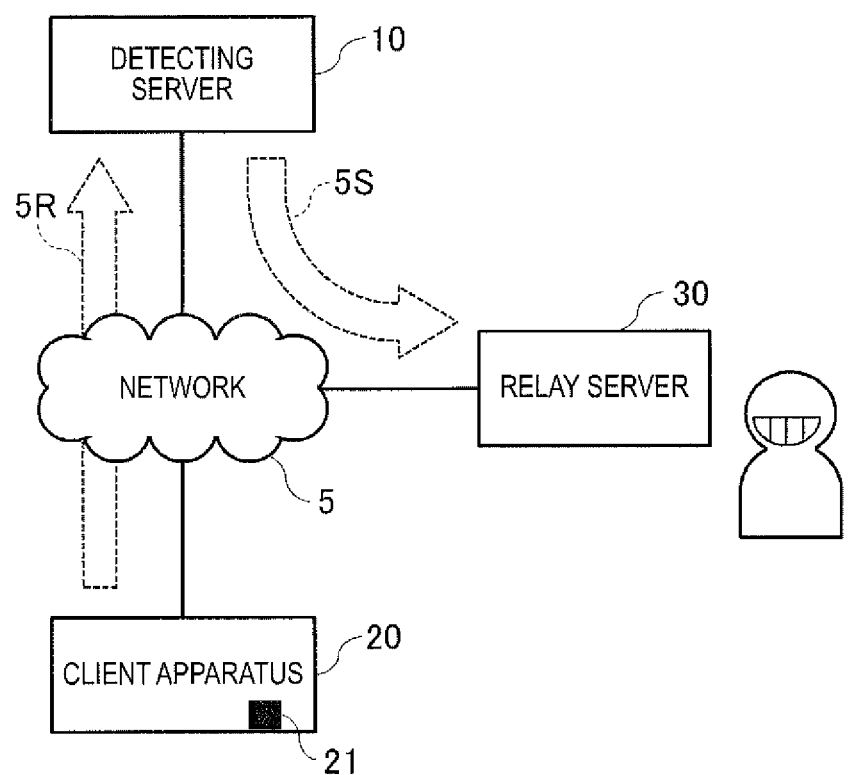
FIG. 1 is a view illustrating an example of a configuration of a detecting server and peripheral apparatuses.

Hereinafter, an example of a mode (hereinafter, referred to as embodiment) for carrying out the present invention will be described with reference to the accompanying drawings. Also, throughout the drawings of this specification, components identical to those described in regard to previous drawings are marked with the same reference numerals, and detailed descriptions thereof may be omitted as appropriate.

[1. System Configuration]

FIG. 1 is a view illustrating an example of a configuration of a detecting server and peripheral apparatuses according to an embodiment. In the present embodiment, a detecting server 10 is, for example, a server computer belonging to a telecommunications operator renting one or more communication channels from other telecommunications operators, and is connected to a network 5 such as the Internet. The detecting server 10 can perform data communication with other apparatuses (such as a client apparatus 20) connected to the network 5.

Also, the detecting server 10 includes a micro processor, a storage unit which is configured by a storage medium such as a RAM or a hard disk drive, a communication interface, a display, a speaker, and so on. The storage unit stores a program for detecting unauthorized communication, and the micro processor performs a variety of infoimation processing according to the program for detecting unauthorized communication. Also, the program for detecting unauthorized communication may be provided in a form in which the program is contained in a computer-readable information storage medium such as an optical disk, a magnetic disk, or a flash memory, or may be provided to the detecting server 10 through a communication means such as the network 5.

The client apparatus 20 is a computer which a customer of a telecommunications operator (hereinafter, also referred to simply as customer) can use to use an information processing service, and includes a micro processor, a storage unit, a communication interface, a display, and a speaker, like the detecting server 10, and further includes a global position system (GPS) receiver for receiving GPS information, and so on. Here, the GPS information represents information on the position of the client apparatus 20. Also, the following description will be made on the assumption that the client apparatus 20 is a mobile info nation terminal such as a smart phone, a tablet PC, or a mobile phone. However, the client apparatus 20 may be a stationary information terminal such as a desktop PC. Also, since it is assumed here that the client apparatus 20 is a mobile information terminal, the follow description will be made on the assumption that the network 5 and the client apparatus 20 are wirelessly connected. However, the network 5 and the client apparatus 20 may be connected by a cable.

Here, a case where malware 21 has been installed in the client apparatus 20 will be described. In most cases, the malware 21 is installed on its own, against the intention of the customer which is the user of the client apparatus 20, without the customer being aware of it. Also, in this specification, it is assumed that spyware includes computer viruses, spyware that collects and transmits private information without permission from users, adware that collects and displays advertisements against the intention of customers, and so on.

The malware 21 installed in the client apparatus 20 transmits a request for information such as confidential information, for example, to the detecting server 10 (5R). In a case where the detecting server 10 does not any measures against the malware 21, if receiving the request, the detecting server 10 transmits confidential information to a relay server 30 such as a server computer connected to the detecting server 10 through the network 5 (5S). That is, the confidential information stored in the detecting server 10 can be spied through the relay server 30 by the third party with bad intention. Also, this unauthorized communication can be performed not only by the malware 21 but also, for example, by a direct operation of the customer or the third party with bad intention on the client apparatus 20.

Therefore, the detecting server 10 according to the present embodiment detects unauthorized communication of the client apparatus 20. If detecting unauthorized communication, the detecting server 10 outputs a warning directly or through the client apparatus 20, or restricts communication with the client apparatus 20 having performed the unauthorized communication, or performance of information processing according to the unauthorized communication.

[3. Functional Blocks]

Figure 2:
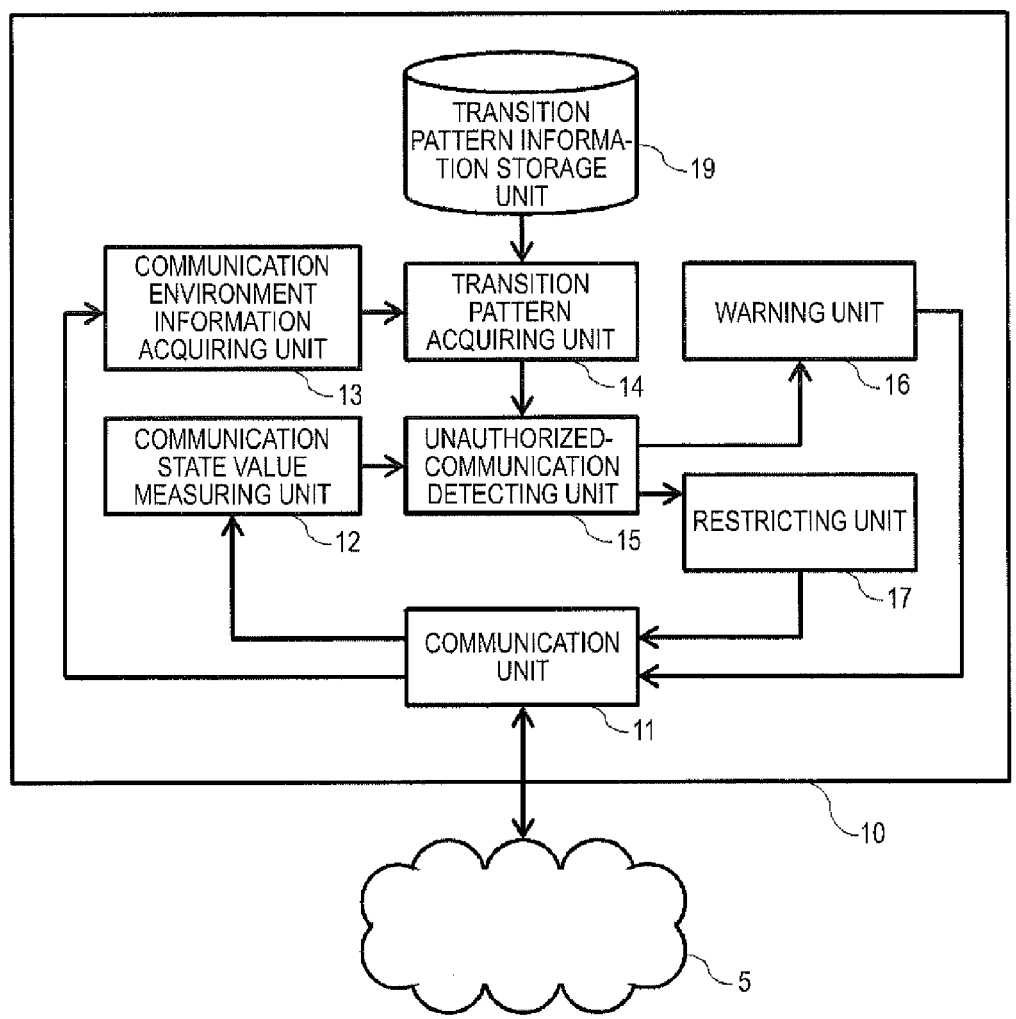
FIG. 2 is a functional block diagram illustrating an example of the functional configuration of the detecting server.

Subsequently, an example of the functions of the detecting server 10 will be described with reference to the functional block diagram of FIG. 2 illustrating an example of the functional configuration of the detecting server 10. As shown in FIG. 2, the detecting server 10 functionally includes a communication unit 11, a communication state value measuring unit 12, a communication environment information acquiring unit 13, a transition pattern acquiring unit 14, an unauthorized-communication detecting unit 15, a warning unit 16, a restricting unit 17, and a transition pattern information storage unit 19.

The communication unit 11 performs communication with other apparatuses such as the client apparatus 20 connected to the network 5, thereby implementing data communication with the client apparatus 20. For example, the communication unit 11 may be configured so as to include a communication interface included in the detecting server 10.

The communication state value measuring unit 12 measures a communication state value transition between the detecting server 10 and the client apparatus 20. In the present embodiment, it is assumed that the communication state value measuring unit 12 measures communication state values, regularly (fore example, at intervals of 1 sec), and the storage unit of the detecting server 10 temporarily stores a sequence of numerical values representing a communication state value transition measured during a predetermined period until the latest measurement time. Here, each communication state value is a value representing a communication state between the detecting server 10 and the client apparatus 20. In the present embodiment, it is assumed that as each communication state value, a usable communication bandwidth (bps/bps or bit/second) (hereinafter, referred to simply as usable bandwidth representing a bandwidth usable in a data transmission channel is used. The communication state value measuring unit 12 may measure usable bandwidths by a known measuring method such as pathChirp or pathload.

Also, a sequence of numerical values representing a communication state value transition which is measured for a predetermined period becomes unique information according to the communication environment of the client apparatus 20 or the execution state of software in the client apparatus 20, and thus is also called "network fingerprint".

Also, in the present embodiment, it is assumed that each communication state is classified into any one of some kinds according to a sequence of numerical values representing a communication state value transition which is measured. More specifically, it is assumed that each communication state is classified into any one of three kinds, that is, a standby state 50-1, a data communication state 50-2, and an unauthorized communication state 50-3 on the basis of FIGS. 3A and 3B illustrating kinds of communication states.

First, the standby state 50-1 is a state where application software of the client apparatus 20 is not performing with the outside. Here, the application software is software which is directly executed by the user of the client apparatus 20, and examples of the application software include video replay software using streaming, a web browser, network games, and so on. That is, in the standby state 50-1, only communication necessary to support the operation and use of the client apparatus 20 is performed to a minimum by other software (for example, system software) different from the application software. In this case, a usable bandwidth represents a relatively large value as compared to the data communication state 50-2 to be described below.

Next, the data communication state 50-2 is a state where data communication between the detecting server 10 and the client apparatus 20 is relatively active, and represents, for example, a state where the client apparatus 20 is uploading data to the detecting server 10. In this case, since the transmission channel is pressed by packets constituting the upload data, and other communication is inhibited, a usable bandwidth represents a relatively small value as compared to the standby state 50-1 or the unauthorized communication state 50-3 to be described below.

Finally, the unauthorized communication state 50-3 is a state where unauthorized communication of the client apparatus 20 is being performed, and represents, for example, a state where the application software is not performing communication with the outside. In most cases, unauthorized communication is performed so as not to be detected by the customer or the telecommunications operator, and thus a relatively small amount of packets is transmitted to the detecting server 10. Therefore, the unauthorized communication state 50-3 is comparatively similar to the standby state 50-1 in the usable bandwidth at each time, but is different from the standby state 50-1 in that, in some periods (for example, portions surrounded by broken lines in FIG. 3B), decreases in the usable bandwidth are confirmed.

The communication environment information acquiring unit 13 acquires the communication environment information of the client apparatus 20 from the client apparatus 20. Here, the communication environment information is information representing at least one of the position of the client apparatus 20 and the communication means of the client apparatus 20.

More specifically, the communication environment information acquiring unit 13 acquires GPS information which the client apparatus 20 has received by the GPS receiver, thereby acquiring information on the position of the client apparatus 20. Also, the communication environment information acquiring unit 13 acquires, for example, information representing a communication standard such as "3.9G" or "3G", as information representing the communication means of the client apparatus 20. The communication environment information acquiring unit 13 may acquire, for example, information included in the contents of communication with the client apparatus 20, as the communication environment information.

The transition pattern information storage unit 19 stores communication state value transition patterns. Here, each communication state value transition pattern is information representing a communication state value transition, more specifically, a sequence of numerical values representing communication state values of a plurality of consecutive measurement times.

In the present embodiment, the transition pattern information storage unit 19 stores a communication state value transition pattern in a period when the application software of the client apparatus 20 is not performing communication with the outside. That is, the transition pattern information storage unit 19 stores a communication state value transition pattern in the standby state 50-1.

FIG. 4 is a view illustrating a data storage example of the transition pattern information storage unit 19. As shown in FIG. 4, the transition pattern information storage unit 19 stores a transition pattern, for example, in association with an apparatus ID for identifying the client apparatus 20, position information, and a communication standard representing a communication means. Also, the apparatus ID needs only to be information identifying the client apparatus 20, and thus may be, for example, an IP address.

In the present embodiment, it is assumed that the transition pattern contains usable bandwidths as communication state values of the measurement times T(0), T(1), . . . , and T(n). Alternatively, in a case where it is apparent that the malware 21 has not been installed in the client apparatus 20, and the client apparatus 20 is in the standby state 50-1, the transition pattern may contain communication state values actually measured.

The transition pattern acquiring unit 14 acquires a transition pattern stored in the transition pattern information storage unit 19. More specifically, the transition pattern acquiring unit 14 acquires a transition pattern associated with the apparatus ID specifying the client apparatus 20 which is the communication partner, and the communication environment information acquired by the communication environment information acquiring unit 13. Here, the communication environment information is information representing at least one of the position information and the communication means.

For example, in a case where transition patterns shown in FIG. 4 has been stored in the transition pattern information storage unit 19 in advance, and the client apparatus 20 having an apparatus ID "D0001" has performed communication with the detecting server 10 while having been at a position b, a transition pattern {BWb(T(0)), BWb(T(1)), BWb(T(n))} is acquired. Also, even in a case where the client apparatus 20 has performed communication by the communication standard "3G", similarly to the above case, the transition pattern {BWb(T(0)), BWb(T(1)), . . . , BWb(T(n))} is acquired.

The unauthorized-communication detecting unit 15 detects unauthorized communication of the client apparatus 20, on the basis of the transition pattern which is acquired in association with the communication environment information by the communication environment information acquiring unit 13, and a communication state value transition which is measured. That is, the unauthorized-communication detecting unit 15 detects that a communication state value transition which is measured represents the unauthorized communication state 50-3, on the basis of the transition pattern acquired by the transition pattern acquiring unit 14.

More specifically, on the basis of correlation values relative to the transition pattern, the unauthorized-communication detecting unit 15 selects a portion of the communication state value transition which is measured. In a case where the difference between the selected communication state value portion and the transition pattern satisfies a predetermined condition, the unauthorized-communication detecting unit 15 detects unauthorized communication of the client apparatus 20. Hereinafter, an example of a process which is performed in the unauthorized-communication detecting unit 15 will be described with reference to FIGS. 5 to 7.

Figure 5:
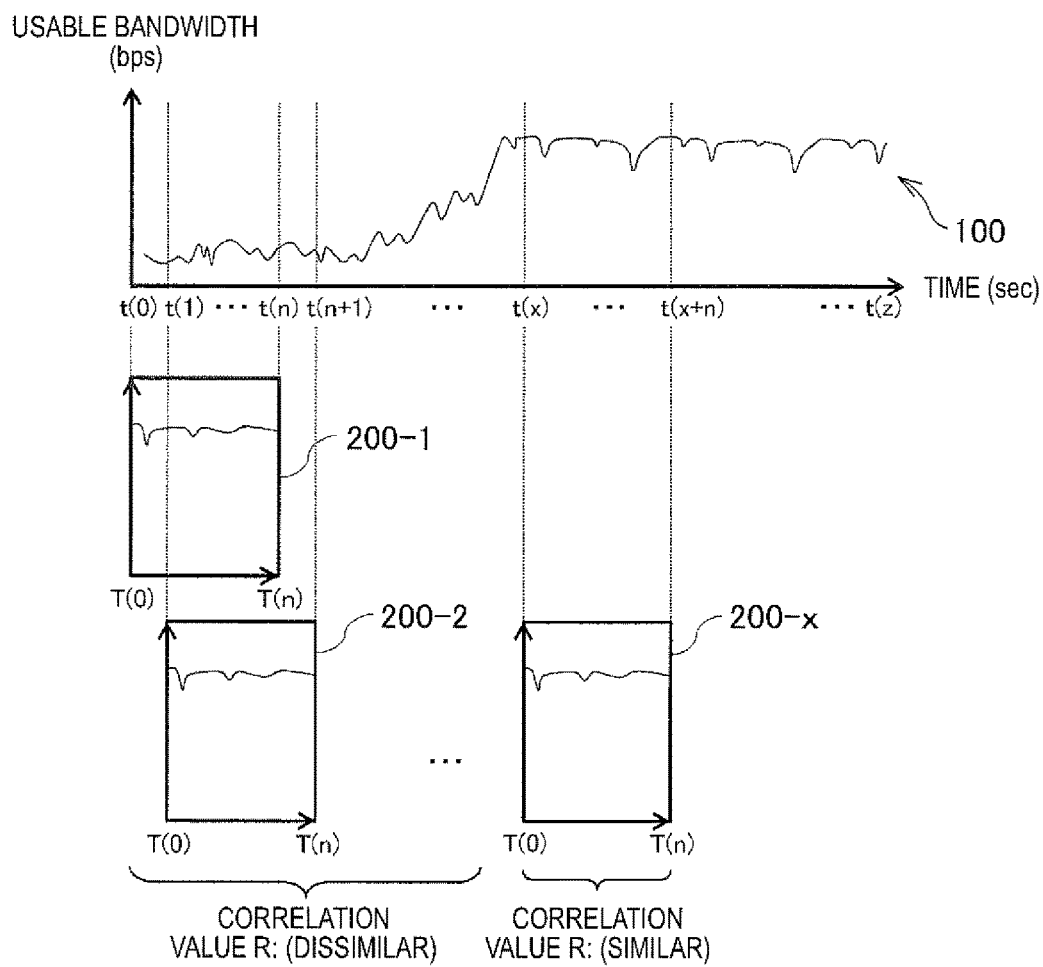
FIG. 5 is a view illustrating a determining process based on correlation values relative to a transition pattern.

FIG. 5 is a view illustrating a determining process based on correlation values relative to a transition pattern. As shown in FIG. 5, with respect to communication state values measured at the measurement times, the unauthorized-communication detecting unit 15 calculates a correlation value between the transition pattern and a portion of the communication state value transition while shifting the transition pattern in the time axis by a predetermined time (for example, 1 second). Here, each correlation value represents the degree of similarity of two comparative objects, and may be calculated, for example, by a known normalized correlation method. That is, in the determining process shown in FIG. 5, from the measured communication state value transition, a portion determined as being similar to the transition pattern is selected.

As shown in FIG. 5, for example, in a case of performing the determining process on the communication state value transition 100 measured from a measurement time t(0) to a measurement time(z), the unauthorized-communication detecting unit 15 compares communication state values measured from the measurement time t(0) to a measurement time t(n) (t(0)<t(n)<t(z)) with the communication state values of a transition pattern 200-1 corresponding to the measurement times t(0), t(1), . . . , t(n), respectively, thereby calculating a correlation value R.

Thereafter, the unauthorized-communication detecting unit 15 determines whether the calculated correlation value R is included in a predetermined threshold value range. In a case where the correlation value R is not included in the threshold value range (that is, a case where it is determined that the measured communication state values are not similar to those of the transition pattern), the unauthorized-communication detecting unit 15 shifts the transition pattern in the time axis by a predetermined time Δt (for example, 1 second) as shown as a transition pattern 200-2 in FIG. 5, and compares communication state values measured at the measurement times t(1) to t(n+1), with the communication state values of the transition pattern 200-2 corresponding to the measurement times t(0), t(1), . . . , t(n), respectively, thereby calculating a correlation value R. Thereafter, the unauthorized-communication detecting unit 15 determines whether that correlation value R is included in the predetermined threshold value range.

In a case where the calculated correlation value R is included in the predetermined threshold value range (that is, a case where it is determined that the measured communication state values are similar to those of the transition pattern), the unauthorized-communication detecting unit 15 selects the communication state value portion corresponding to that correlation value R (in the example shown in FIG. 1, the communication state values measured at the measurement times t(x) to t(x+n)). Thereafter, the unauthorized-communication detecting unit 15 further performs a determining process shown in FIG. 6.

Figures 6, 7:
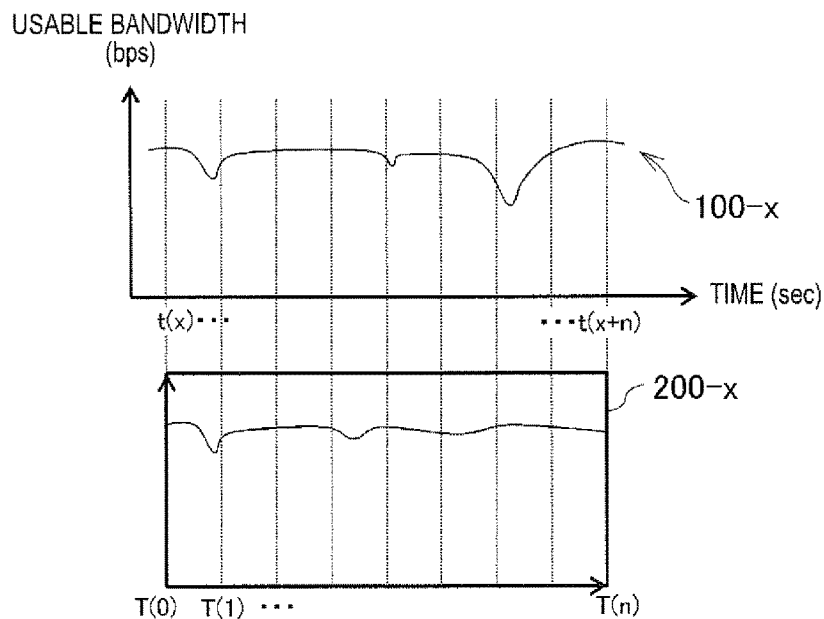
FIG. 6 is a view illustrating a determining process based on the difference between a selected communication state value portion and a transition pattern.
FIG. 7 is a view illustrating an example of data which are calculated in the determining process based on the difference between the selected portion and the transition pattern.

FIG. 6 is a view illustrating a determining process based on the difference between the selected communication state value portion and the transition pattern. As shown in FIG. 6, on the basis of the selected communication state value portion (that is, the communication state values measured at the measurement times t(x) to t(x+n)) 100-x and the communication state values of the transition pattern corresponding to the measurement times t(x) to t(x+n), the unauthorized-communication detecting unit 15 calculates a difference between communication state values at each measurement time, and calculates the sum of calculated differences. In this determining process, it is determined whether the measured communication state value transition is different from the transition pattern representing the standby state 50-1.

FIG. 7 is a view illustrating an example of data which is calculated in the determining process based on the difference from the transition pattern. As shown in FIG. 7, in the present embodiment, the unauthorized-communication detecting unit 15 calculates the differences (BW(t)−BWp(T)) between measured usable bandwidths BW(t) and usable bandwidths BWp(T) of a transition pattern, and the sum ($\Sigma\alpha$) of the differences, thereby detecting unauthorized communication of the client apparatus 20.

By the way, as shown in FIGS. 3A and 3B, the communication state 50-3 in a case where unauthorized communication of the client apparatus 20 is being performed is similar to the standby state 50-1, but is different from the standby state in that in some periods, decreases in the usable bandwidth are recognized. Therefore, it is assumed that, in a case of obtaining the differences (BW(t))−BWp(T)) between usable bandwidths shown in FIG. 7, in order to exclude cases where the communication state is not the unauthorized communication state 50-3, the unauthorized-communication detecting unit 15 according to the present embodiment complies with the following rules. In a case where a difference (BW(t))−BWp(T)) is equal to or greater than 0, the unauthorized-communication detecting unit 15 sets the difference to 0, and in a case where a difference (BW(t))−BWp(T)) is less than 0, the unauthorized-communication detecting unit 15 calculates the difference (BW(t))−BWp(T)).

Here, in a case where the difference between a portion of the measured communication state value transition and the transition pattern satisfies a predetermined condition, the unauthorized-communication detecting unit 15 detects unauthorized communication of the client apparatus 20. In the present embodiment, the unauthorized-communication detecting unit 15 calculates the sum $\Sigma\alpha$ of the differences between the communication state values, and in a case where the sum is included in the threshold value range representing the unauthorized communication state 50-3, the unauthorized-communication detecting unit 15 detects that unauthorized communication of the client apparatus 20 has been performed. However, the present invention is not limited thereto. For example, the unauthorized-communication detecting unit 15 may detect unauthorized communication in the client apparatus 20 in a case where the differences (BW(t)−BWp(T)) between usable bandwidths corresponding to a predetermined number of consecutive measurement times are not included in the threshold value range representing the unauthorized communication state 50-3. Besides this condition, in a case where the differences between usable bandwidths corresponding to a predetermined number of consecutive measurement times are included in the threshold value range representing the standby state 50-1, the unauthorized-communication detecting unit 15 may detect unauthorized communication of the client apparatus 20.

Also, the unauthorized-communication detecting unit 15 finishes the determining process if the determining process on the latest measurement time t(z) finishes, or repeats the above described determining process until it is determined that unauthorized communication of the client apparatus 20 has been performed. Also, the unauthorized-communication detecting unit 15 may perform the above described detecting process if communication state value measurement of a predetermined measurement period finishes, or whenever a new communication state value is measured.

In a case where the unauthorized-communication detecting unit 15 detects unauthorized communication from the client apparatus 20, the warning unit 16 issues a warning output instruction. More specifically, the warning unit 16 instructs the display of the detecting server 10 to output a warning screen, or instructs the speaker of the detecting server 10 to output an alarm sound for transmitting a warning. Also, the warning unit 16 may transmit an instruction for outputting a warning, to the client apparatus 20, such that the client apparatus 20 outputs a warning on the display or through the speaker for the customer which is the user of the client apparatus 20.

If the unauthorized-communication detecting unit 15 detects unauthorized communication from the client apparatus 20, the restricting unit 17 restricts communication with the client apparatus 20 or performance of information processing according to a request from the client apparatus 20. In a case where a request from the client apparatus 20 is the result of unauthorized communication, the restricting unit 17 prevents information processing according to that request from being performed (for example, the restricting unit 17 prevents confidential information from being transmitted to the relay server 30).

[4. Flow Charts]

Hereinafter, examples of a process which is performed in the detecting server 10 according to the present embodiment will be described with respect to the flow charts of FIGS. 8 and 9.

Figure 8:
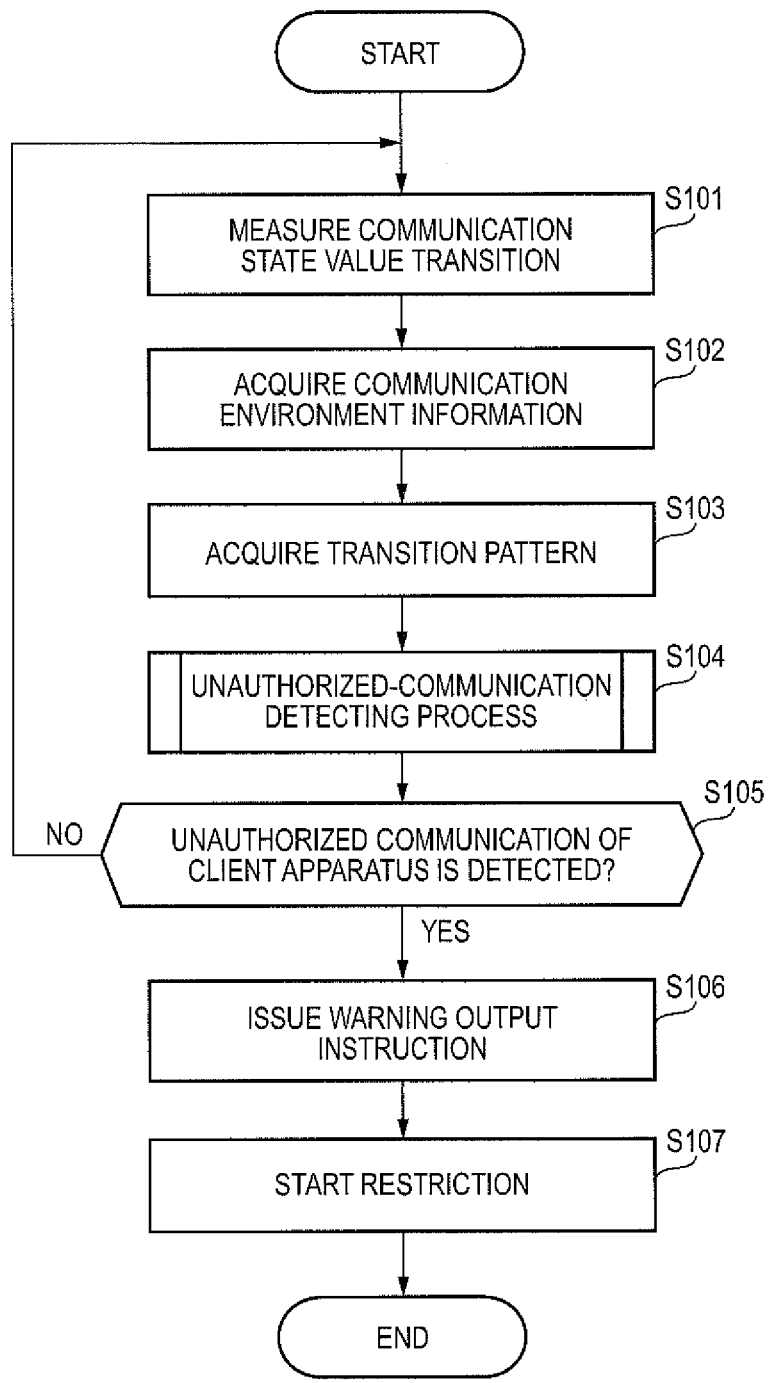
FIG. 8 is a flow chart illustrating an example of a process which is performed in the detecting server.

FIG. 8 is a flow chart illustrating an example of a process which is performed in the detecting server 10. As shown in FIG. 8, in STEP S101, the communication state value measuring unit 12 measures a communication state value transition relative to the client apparatus 20 (for example, usable bandwidths at predetermined intervals). Thereafter, in STEP S102, the communication environment information acquiring unit 13 acquires communication environment information representing at least one of the position and communication means such as a communication standard of the client apparatus 20.

In STEP S103, the transition pattern acquiring unit 14 acquires a transition pattern associated with the apparatus ID identifying the client apparatus 20 which is the communication partner, and the communication environment information acquired in STEP S102, from the transition pattern information storage unit 19. Next, in STEP S104, the unauthorized-communication detecting unit 15 performs an unauthorized-communication detecting process. Hereinafter, the unauthorized-communication detecting process which is performed in STEP S104 will be described in detail with reference to the flow chart of FIG. 9.

Figure 9:
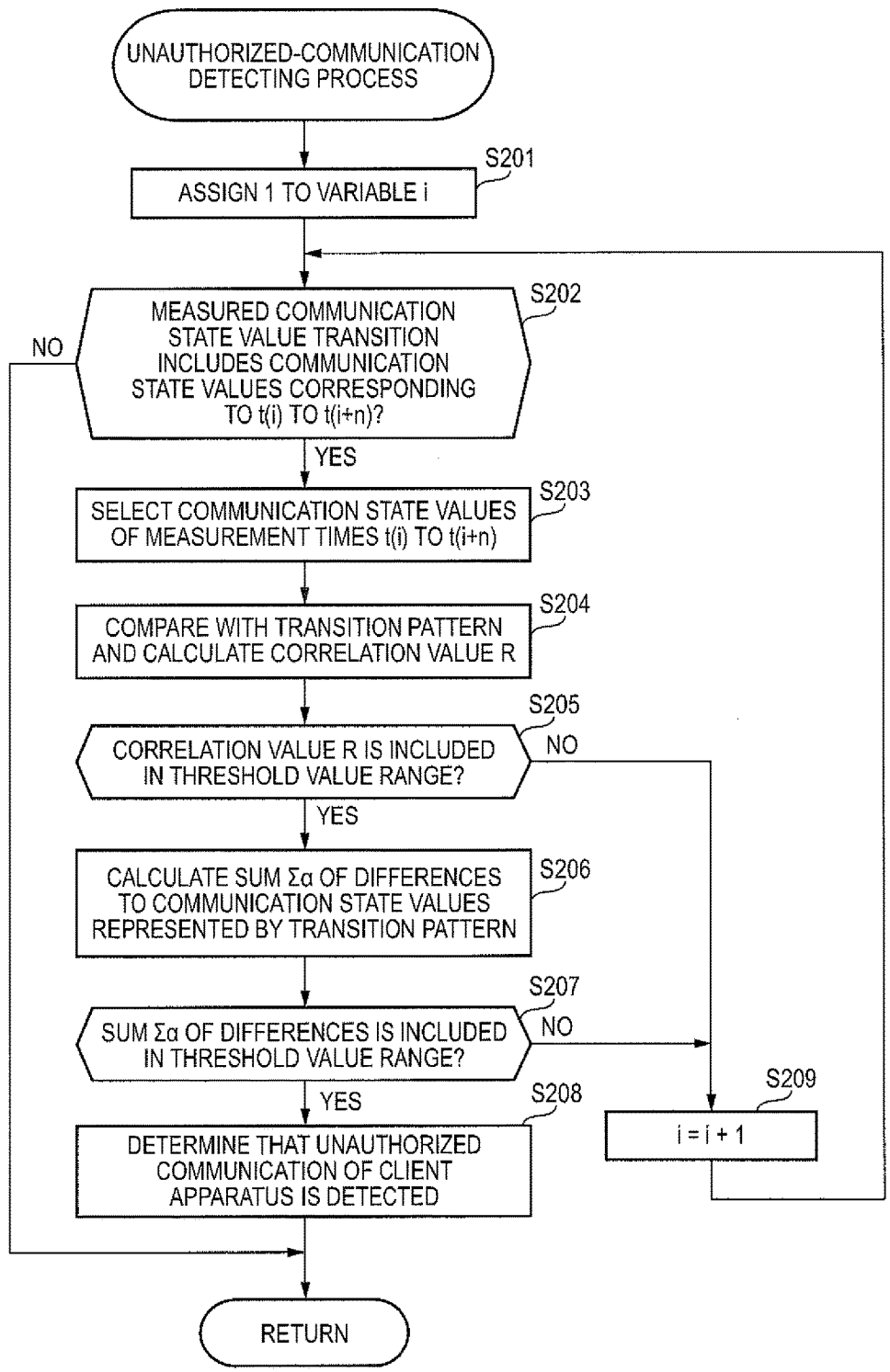
FIG. 9 is a flow chart illustrating an example of an unauthorized-communication detecting process.

FIG. 9 is a flow chart illustrating an example of the unauthorized-communication detecting process. As shown in FIG. 9, the unauthorized-communication detecting unit 15 assigns 1 to a variable i in STEP S201, and determines whether the communication state value transition measured by the communication state value measuring unit 12 includes communication state values corresponding to the measurement times t(i) to t(i+n), in STEP S202. Also, in the present embodiment, it is assumed that "n" corresponds to the number N of communication state values which are included in each transition pattern, and is within a range from 1 to (N−1).

In a case where the communication state values corresponding to the measurement times t(i) to t(i+n) have been measured ("Y" in STEP S202), the unauthorized-communication detecting unit 15 selects the communication state values of the measurement times t(i) to t(i+n) in STEP S203, and compares the selected communication state values with the transition pattern acquired in STEP S103, thereby calculate the correlation value R, in STEP S204. In STEP S205, the unauthorized-communication detecting unit 15 determines whether the calculated correlation value R is included in the predetermined threshold value range. That is, on the basis of the calculated correlation value R, the unauthorized-communication detecting unit 15 determines whether the communication state values measured at the measurement times are similar to those of the transition pattern.

In a case where the correlation value R is included in the predetermined threshold value range (that is, in a case where it is determined that the communication state values are similar to those of the transition pattern) ("Y" in STEP S205), in STEP S206, the unauthorized-communication detecting unit 15 calculates the sum $\Sigma\alpha$ of differences between the communication state values selected in STEP S203 and the communication state values represented by the transition pattern. Thereafter, the unauthorized-communication detecting unit 15 determines whether the calculated sum $\Sigma\alpha$ is included in the threshold value range. That is, the unauthorized-communication detecting unit 15 can determine whether the measured communication state value transition is different from the transition pattern representing the standby state 50-1 and represents the unauthorized communication state 50-3.

In a case where the calculated sum $\Sigma\alpha$ is not included in the predetermined threshold value range (a case where it is determined that the measured communication state value transition is not different from the transition pattern) (STEP S207), the unauthorized-communication detecting unit 15 determines that unauthorized communication of the client apparatus 20 has been detected, in STEP S208, and finishes the unauthorized-communication detecting process.

Meanwhile, in a case where the correlation value is not included in the threshold value range ("N" in STEP S205), or in a case where the sum $\Sigma\alpha$ is not included in the threshold value range ("N" in STEP S207), the unauthorized-communication detecting unit 15 adds 1 to the variable i (that is, the unauthorized-communication detecting unit 15 shifts the measurement time by a predetermined time) in STEP S209, and repeats the determining process of STEPS S202 to S207. The unauthorized-communication detecting unit 15 repeats the above described determining process until it is determined that a communication state value corresponding to the measurement time t(i+n) has not been measured ("N" in STEP S202), or until it is determined that communication state values selected in STEP S203 satisfy the conditions of STEPS S205 and S207, and then finishes the unauthorized-communication detecting process. Hereinafter, the flow chart shown in FIG. 8 will be described again.

Returning to FIG. 8, in a case where it is determined that unauthorized communication of the client apparatus 20 has been detected by the unauthorized-communication detecting process ("Y" in STEP S105), in STEP S106, the warning unit 16 issues a warning output instruction. The warning unit 16 issues the instruction such that warning output is performed by the display or speaker of the detecting server 10 or by the display or speaker of the client apparatus 20.

Also, in a case where unauthorized communication of the client apparatus 20 has been detected by the unauthorized-communication detecting process ("Y" in STEP S105), in STEP S107, the restricting unit 17 starts restriction on communication with the client apparatus 20 or performance of information processing according to a request from the client apparatus 20. Meanwhile, in a case where unauthorized communication of the client apparatus 20 has not been detected ("N" in STEP S105), the detecting server 10 repeats a series of processes from communication state value transition measurement to the unauthorized-communication detecting process (STEPS S101 to S104), and performs the detecting process on unauthorized communication of the client apparatus 20.

In the detecting server 10 described above, a communication state value transition measured by the communication state value measuring unit 12 is compared with a transition pattern stored in the transition pattern information storage unit 19, whereby unauthorized communication of the client apparatus 20 is detected.

[5. Modifications]

Although the embodiment of the present invention has been described, the present invention is not limited to the above described embodiment. Hereinafter, examples obtained by modifying the embodiment of the present invention (modifications) will be described.

(1) In the embodiment, communication state values are usable bandwidths. However, communication state values may be, for example, occupied communication bandwidths which are occupied bandwidths which are estimated on the basis of measured usable bandwidths, and are, hereinafter, also referred to simply as occupied bandwidths. The occupied bandwidths can be calculated, for example, by the following expression.

[OCCUPIED BANDWIDTH]=[MAXIMUM USABLE BANDWIDTH](BASED ON SPECIFICATIONS OR PAST RECORDS)−[MEASURED USABLE BANDWIDTH]

In this case, the communication state value measuring unit 12 measures an occupied bandwidth transition on the basis of measured usable bandwidths, and the transition pattern information storage unit 19 stores an occupied bandwidth transition which is measured for a measurement period, as a transition pattern.

Also, in this case, the unauthorized-communication detecting unit 15 detects unauthorized communication of the client apparatus 20, on the basis of correlation values between an occupied bandwidth transition which is measured and a transition pattern, and the difference between a portion of the occupied bandwidth transition and the transition pattern. Also, in a case where the maximum usable bandwidth is set to a fixed value, correlation values and a difference from a transition pattern which are calculated with respect to occupied bandwidths are synonymous with correlation values and a difference from a transition pattern which are calculated with respect to usable bandwidths in the above described embodiment. Therefore, the unauthorized-communication detecting unit 15 may detect unauthorized communication of the client apparatus 20 on the basis of occupied bandwidths by the same method as that in the embodiment.

(2) Alternatively, communication state values may be, for example, actual data reception amounts of the detecting server 10, packet loss rates, round trip times, or the like.

(3) In the embodiment, the transition pattern information storage unit 19 stores a communication state value transition pattern in a period when the application software of the client apparatus 20 is not performing communication with the outside (for example, the transition pattern in the standby state 50-1 shown in FIG. 3A). However, the transition pattern information storage unit 19 may store a communication state value transition pattern in a case where the client apparatus 20 is performing specific unauthorized communication (for example, the transition pattern in the unauthorized communication state 50-3 shown in FIG. 3B). In this case, if measured communication state values are similar to those of a transition pattern acquired from the transition pattern information storage unit 19, the unauthorized-communication detecting unit 15 may detect that unauthorized communication of the client apparatus 20 has been performed.

More specifically, in a case where a correlation value calculated between a measured communication state value transition and a transition pattern representing the unauthorized communication state 50-3 and stored in the transition pattern information storage unit 19 is within a predetermined threshold value range, the unauthorized-communication detecting unit 15 may detect unauthorized communication of the client apparatus 20.

(4) Also, the unauthorized-communication detecting unit 15 may detect unauthorized communication of the client apparatus 20 in a case where the difference between a transition pattern and a measured communication state value transition satisfies a predetermined condition. For example, in a case where the sum $\Sigma\alpha$ of the differences between communication state values of the measurement times is within the threshold value range representing the unauthorized communication state 50-3, the unauthorized-communication detecting unit 15 may detect unauthorized communication of the client apparatus 20. Also, for example, in a case where the differences between communication state values corresponding to a plurality of consecutive measurement times are within the threshold value range representing the unauthorized communication state 50-3, the unauthorized-communication detecting unit 15 may detect unauthorized communication of the client apparatus 20.

(5) Also, in the present embodiment, the detecting server 10 detects unauthorized communication of the client apparatus 20. However, the detecting server 10 may detect unauthorized communication of itself. For example, the communication state value measuring unit 12 of the detecting server 10 may measure a communication state value transition between the detecting server 10 and another apparatus such as the client apparatus 20 connected to the network 5, and the unauthorized-communication detecting unit 15 may compare the measured communication state value transition with a transition pattern stored in advance, thereby detecting unauthorized communication of the detecting server 10.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An unauthorized-communication detecting apparatus comprising:
   a processor; and
   a storage device storing a program which causes the processor to function as:
      a measuring unit that measures a transition of a communication state value between the unauthorized-communication detecting apparatus and a client apparatus;
      a transition pattern storage unit that stores a transition pattern of the communication state value; and
      an unauthorized-communication detecting unit that detects unauthorized communication of the client apparatus on the basis of the transition pattern and a transition of the measured communication state value,
   wherein the transition pattern stored in the transition pattern storage unit is a transition pattern being acquired during a standby state during which the application software of the client apparatus is not performing communication with the outside.

2. The unauthorized-communication detecting apparatus according to claim 1, wherein the communication state value is usable communication bandwidths or occupied communication bandwidths.

3. The unauthorized-communication detecting apparatus according to claim 1, wherein the unauthorized-communication detecting unit selects a portion of the transition of the measured communication state value on the basis of correlation values relative to the transition pattern, and in a case where the difference between the selected portion and the transition pattern satisfies a predetermined condition, the unauthorized- communication detecting unit detects the unauthorized communication of the client apparatus.

4. The unauthorized-communication detecting apparatus according to claim 1,
   wherein the program stored in the storage device causes the processor to further function as an acquiring unit that acquires communication environment information of the client apparatus from the client apparatus,
   wherein the transition pattern storage unit stores the transition pattern in association with the communication environment information of the client apparatus, and
   the unauthorized-communication detecting unit detects the unauthorized communication of the client apparatus on the basis of the transition pattern associated with the acquired communication environment information, and the transition of the measured communication state value.

5. The unauthorized-communication detecting apparatus according to claim 4, wherein the communication environment information represents at least one of a position of the client apparatus and communication unit of the client apparatus.

6. A non-transitory computer readable medium storing a program causing a computer to execute an unauthorized-communication detecting process, the process comprising:
   measuring a transition of a communication state value between the unauthorized-communication detecting apparatus and a client apparatus;
   storing a transition pattern of the communication state value; and
   detecting unauthorized communication of the client apparatus on the basis of the transition pattern and a transition of the measured communication state value,
   wherein the stored transition pattern is a transition pattern being acquired during a standby state during which the application software of the client apparatus is not performing communication with the outside.

7. An unauthorized-communication detecting apparatus comprising:
   a processor; and
   a storage device storing a program which causes the processor to function as:

a measuring unit that measures a transition of a communication state value between the unauthorized-communication detecting apparatus and a client apparatus;

a transition pattern storage unit that stores a transition pattern of the communication state value; and an unauthorized-communication detecting unit that detects unauthorized communication of the client apparatus on the basis of the transition pattern and a transition of the measured communication state value, wherein the transition pattern stored in the transition pattern storage unit is a transition pattern being acquired while only communication necessary to support operation and use of the client apparatus is performed by system software.

* * * * *